(12) United States Patent
Hiyama et al.

(10) Patent No.: US 10,477,059 B2
(45) Date of Patent: Nov. 12, 2019

(54) INFORMATION READING DEVICE

(71) Applicant: NIDEC SANKYO CORPORATION, Suwa-gun, Nagano (JP)

(72) Inventors: Chisato Hiyama, Nagano (JP); Daigo Ogura, Nagano (JP); Masahiro Ikeda, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/323,658

(22) PCT Filed: Aug. 8, 2017

(86) PCT No.: PCT/JP2017/028696
§ 371 (c)(1),
(2) Date: Feb. 6, 2019

(87) PCT Pub. No.: WO2018/030377
PCT Pub. Date: Feb. 15, 2018

(65) Prior Publication Data
US 2019/0166278 A1    May 30, 2019

Related U.S. Application Data

(60) Provisional application No. 62/371,904, filed on Aug. 8, 2016.

(30) Foreign Application Priority Data

Jun. 28, 2017   (JP) ................................. 2017-126364

(51) Int. Cl.
*H04N 1/10*    (2006.01)
*H04N 1/107*   (2006.01)
(Continued)

(52) U.S. Cl.
CPC ............. *H04N 1/1056* (2013.01); *G02B 3/06* (2013.01); *H04N 1/00806* (2013.01);
(Continued)

(58) Field of Classification Search
CPC . G06T 2207/10008; G06T 2207/30176; G06T 5/50; H04N 1/00806;
(Continued)

(56) References Cited

U.S. PATENT DOCUMENTS 6,172,772 B1 *   1/2001   Steinle .................. H04N 1/401
                                                                358/406
8,610,976 B1 *  12/2013   Cook ....................... G06T 5/50
                                                                358/463
(Continued)

FOREIGN PATENT DOCUMENTS

JP      56027169 A     3/1981
JP      60214349 A    10/1985
(Continued)

OTHER PUBLICATIONS

International Search Report corresponding to Application No. PCT/JP2015/070699; dated Aug. 18, 2015, with English translation.

*Primary Examiner* — Negussie Worku
(74) *Attorney, Agent, or Firm* — Cantor Colburn LLP

(57) ABSTRACT

An information reading device that optically reads information recorded on an information recording medium may include a transparent placement member; a first illumination light a second illumination light a first optical system to read information on the lower surface of the information recording medium; a second optical system to read information on the upper surface of the information recording medium; and a cover member. The second optical system may include a reflection mirror. A medium disposition part may be formed by the placement member and the cover member. The upper
(Continued)

surface portion and the side surface portions may be transparent. The second illumination light may be disposed on outer sides of the medium disposition part in the left-right direction. Light emitted from the second illumination light and transmitted through the side surface portions may be irradiated onto the upper surface of the information recording medium placed on the placement member.

6 Claims, 7 Drawing Sheets

(51) Int. Cl.
*H04N 1/00* (2006.01)
*H04N 1/028* (2006.01)
*G02B 3/06* (2006.01)

(52) U.S. Cl.
CPC ....... *H04N 1/0283* (2013.01); *H04N 1/02815* (2013.01); *H04N 1/02835* (2013.01); *H04N 1/107* (2013.01)

(58) Field of Classification Search
CPC .. H04N 1/02815; H04N 1/1056; H04N 1/107; H04N 1/0044; H04N 1/00702; H04N 1/00708; H04N 1/00777; H04N 1/0283; H04N 1/02835; H04N 1/10; H04N 2201/0081; H04N 2201/0094; H04N 5/222; G02B 3/06; G06K 2209/01; G06K 7/10722; G06K 9/00449; G06K 9/3233
USPC ..... 358/504, 3.15, 3.27, 406, 463, 509, 517, 358/474, 475; 382/199, 254, 274, 275
See application file for complete search history.

(56) References Cited

U.S. PATENT DOCUMENTS

| | | | |
|---|---|---|---|
| 2004/0027620 A1* | 2/2004 | Tseng | H04N 1/00572 358/474 |
| 2010/0027079 A1* | 2/2010 | Nishina | H04N 1/0285 358/474 |
| 2012/0099165 A1* | 4/2012 | Omori | H04N 1/0473 358/475 |
| 2012/0113481 A1* | 5/2012 | Ootsu | H04N 1/02835 358/474 |
| 2019/0130147 A1* | 5/2019 | Ikeda | G06K 7/10722 |
| 2019/0174021 A1* | 6/2019 | Hiyama | H04N 1/00806 |

FOREIGN PATENT DOCUMENTS

| | | |
|---|---|---|
| JP | 10257245 A | 9/1998 |
| JP | 2007188387 A | 7/2007 |
| JP | 2013138383 A | 7/2013 |
| WO | 2014129152 A1 | 8/2014 |

* cited by examiner

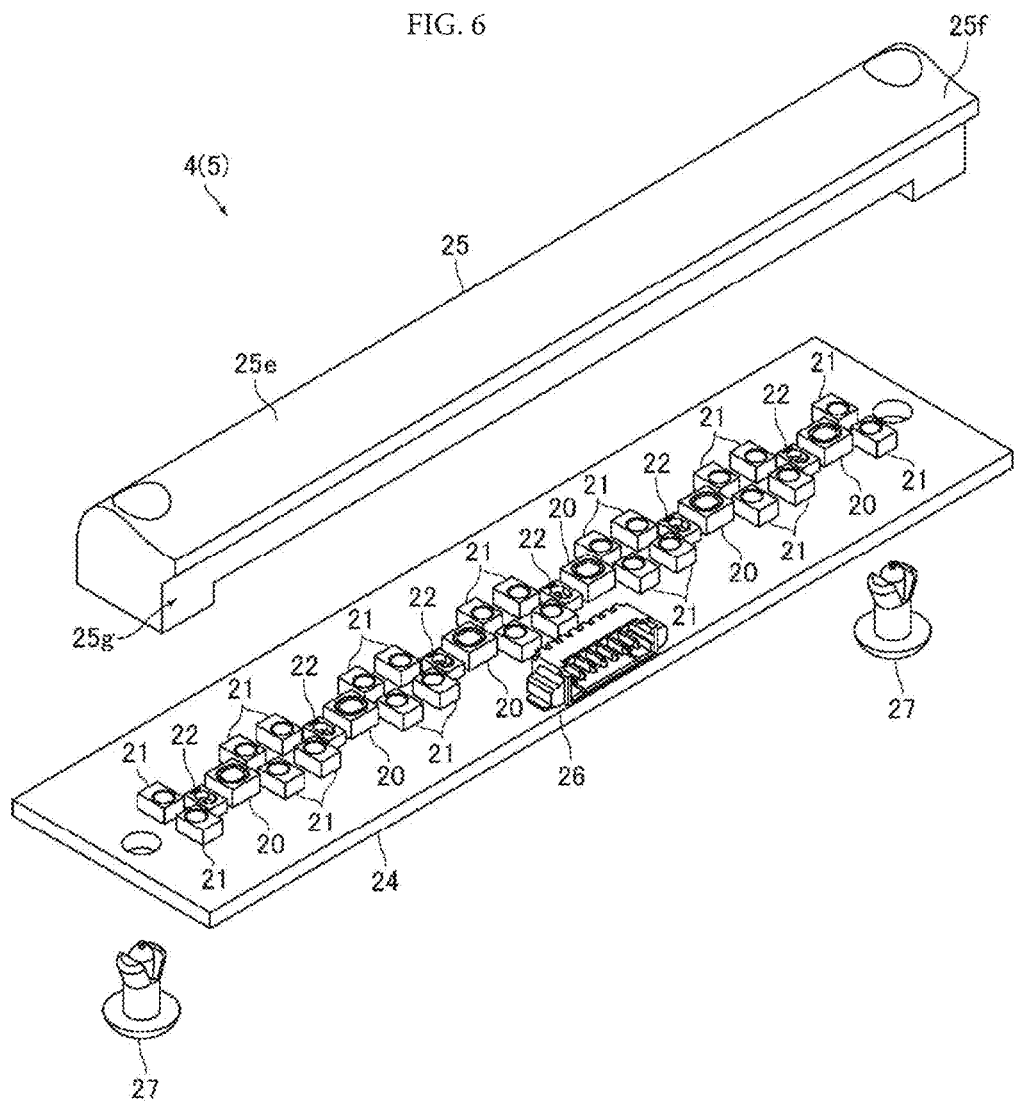

INFORMATION READING DEVICE

CROSS REFERENCE TO RELATED APPLICATIONS

This is the U.S. national stage of application No. PCT/JP2017/028696, filed on Aug. 8, 2017. Priority under 35 U.S.C. § 119(a) and 35 U.S.C. § 365(b) is claimed from Japanese Application No. 2017-126364, filed Jun. 28, 2017; the disclosures of which are incorporated herein by reference. Priority under 35 U.S.C. 119(e) is claimed from U.S. Provisional Application No. 62/371,904, filed on Aug. 8, 2016, the disclosure of which is incorporated herein by reference.

TECHNICAL FIELD

At least an embodiment of the present invention relates to an information reading device that optically reads information recorded on an information recording medium.

BACKGROUND

Conventionally, an image reading device that reads an image that is an object to be read is known (refer to Patent Literature 1, for example). The image reading device described in Patent Literature 1 includes a cover glass on which the object to be read is placed. A light source element, and a light guiding body that irradiates a light emitted from the light source element onto the object to be read, are disposed on the side below the cover glass. Also, an imaging optical system and a sensor IC are arranged under the cover glass. With this image reading device, an image of a lower surface of the object to be read that is placed on the cover glass is read.

CITATION LIST

[Patent Literature 1] International Publication No. 2014/129152

The inventors of the present application have examined the structure of an image reading device capable of optically reading information on both surfaces of an information recording medium that requires image information on both surfaces. In the image reading device described in Patent Literature 1, in order to optically read the information recorded on both surfaces of the information recording medium, an illumination light for irradiating light onto an upper surface of the information recording medium placed on the cover glass, and an optical system for reading information on the upper surface of the information recording medium, and the like, need only be provided.

However, if dust adheres to optical components that constitute the optical system for reading information on the upper surface of the information recording medium, or to the illumination light that irradiates light onto the upper surface of the information recording medium, the reading accuracy of the image on the upper surface of the information recording medium may decrease, so it is necessary to ensure that dust will not adhere to the optical components that constitute the optical system, or to the illumination light. Also, if the disposition of the illumination light that irradiates light onto the upper surface of the information recording medium placed on the cover glass is not taken into consideration, glare may occur on a read image on the upper surface of the information recording medium.

SUMMARY

Therefore, at least an embodiment of the present invention provides an information reading device that optically reads information recorded on both surfaces of an information recording medium, which is capable of inhibiting dust from adhering to an optical component that constitutes an optical system for reading information on an upper surface of the information recording medium, and to an illumination light that irradiates light onto the upper surface of the information recording medium, and inhibiting glare from occurring on a read image on the upper surface of the information recording medium.

To solve the above problem, the information reading device of at least an embodiment of the present invention is an information reading device that optically reads information recorded on an information recording medium, which includes a transparent placement member on which the information recording medium is placed; a first illumination light that irradiates a light onto a lower surface of the information recording medium placed on the placement member; a second illumination light that irradiates a light onto an upper surface of the information recording medium placed on the placement member; a first optical system for reading information recorded on the lower surface of the information recording medium placed on the placement member; and a second optical system for reading information recorded on the upper surface of the information recording medium placed on the placement member; and, when an insertion direction side of the information recording medium into the information reading device is a far side, a removal direction side of the information recording medium from the information reading device is a front side, an insertion-removal direction of the information recording medium with respect to the information reading device is a front-rear direction, and a direction orthogonal to an up-down direction and the front-rear direction is a left-right direction, a cover member having an upper surface portion disposed above the information recording medium placed on the placement member, side surface portions that are connected to both left and right end sides of the upper surface portion, and a far surface portion that is connected to the far end side of the upper surface portion, in which the second optical system includes a reflection mirror that is disposed above the upper surface portion and to which light reflected by the upper surface of the information recording medium is incident, lower ends of the side surface portions and a lower end of the far surface portion are in contact with the upper surface of the placement member, a box-like medium disposition part that is open on the front side and within which at least a portion of the information recording medium is disposed, is formed by the placement member and the cover member, the upper surface portion and the side surface portions are transparent, the second illumination light is disposed on both outer sides of the medium disposition part in the left-right direction, and light emitted from the second illumination light and transmitted through the side surface portions is irradiated onto the upper surface of the information recording medium placed on the placement member.

With the information reading device of at least an embodiment of the present invention, the lower ends of the side surface portions and the lower end of the far surface portion that constitute the cover member are in contact with the upper surface of the placement member, and the box-like medium disposition part that is open on the front side is formed by the placement member and the cover member. Therefore, with at least an embodiment of the present invention, it is possible to prevent dust from getting into the place where the second optical system is disposed and the place where the second illumination light is disposed, from the place where the information recording medium is disposed, of the medium disposition part. Thus, in at least an embodiment of the present invention, it is possible to inhibit dust from adhering to the optical components that constitute the second optical system for reading the information on the upper surface of the information recording medium, and to the second illumination light that irradiates light onto the upper surface of the information recording medium.

Also, in at least an embodiment of the present invention, the reflection mirror to which the light reflected by the upper surface of the information recording medium is incident is disposed above the upper surface portion of the cover member. Meanwhile, the second illumination light is disposed on both outer sides of the medium disposition part in the left-right direction, and the light that is emitted from the second illumination light and transmitted through the transparent side surface portions is irradiated onto the upper surface of the information recording medium placed on the placement member. Therefore, in at least an embodiment of the present invention, the incident angle of the light that the second illumination light irradiates onto the upper surface of the information recording medium is increased, which makes it possible to prevent the light reflected by the upper surface of the information recording medium from being directly incident to the image pickup device. Thus, in at least an embodiment of the present invention, glare can be inhibited from occurring on a read image on the upper surface of the information recording medium.

Also, in at least an embodiment of the present invention, the second illumination light is disposed on both outer sides of the medium disposition part in the left-right direction, and the light that is emitted from the second illumination light and transmitted through the transparent side surface portions is irradiated onto the upper surface of the information recording medium placed on the placement member, so an operator that inserts and removes the information recording medium with respect to the medium disposition part on the front side of the information reading device will no longer feel that the light irradiated onto the upper surface of the information recording medium from the second illumination light is bright.

In at least an embodiment of the present invention, the information reading device includes an image pickup device disposed on the far side of the far surface portion, and the far surface portion is a light blocking portion that blocks light going toward the far side. With this kind of structure, it is possible to prevent the light irradiated from the first illumination light and the light irradiated from the second illumination light from being directly incident to the image pickup device disposed on the far side of the far surface portion.

In at least an embodiment of the present invention, the first illumination light and the second illumination light include a plurality of white LEDs that emit white light, a plurality of infrared LEDs that emit infrared light, a plurality of ultraviolet LEDs that emit ultraviolet light, a substrate on which the plurality of white LEDs, the plurality of infrared LEDs, and the plurality of ultraviolet LEDs are mounted, and an illumination light lens to which the white light emitted by the plurality of white LEDs, the infrared light emitted by the plurality of infrared LEDs, and the ultraviolet light emitted by the plurality of ultraviolet LEDs are incident.

With this kind of configuration, it is possible to read machine-readable printed information such as OCR characters recorded on the information recording medium, for example, using the infrared light emitted from the infrared LEDs. Also, it is possible to read information printed with invisible fluorescent ink, for example, using the ultraviolet light emitted from the ultraviolet LEDs. Also, with this kind of structure, the white light emitted by the plurality of white LEDs, the infrared light emitted by the plurality of infrared LEDs, and ultraviolet light emitted by the plurality of ultraviolet LEDs are incident to the common illumination light lens, so the structure of the information reading device can be simplified compared to a case where an illumination light lens to which the white light is incident, an illumination light lens to which the infrared light is incident, and an illumination light lens to which the ultraviolet light is incident are provided separately.

In at least an embodiment of the present invention, for example, an incident surface for white light, of the illumination light lens, is formed in a convex shape, an incident surface for infrared light, of the illumination light lens, is formed in a concave shape, and an incident surface for ultraviolet light, of the illumination light lens, is formed in a concave shape.

As described above, in at least an embodiment of the present invention, it is possible, in an information reading device that optically reads information recorded on both surfaces of an information recording medium, to inhibit dust from adhering to optical components that constitute an optical system for reading the information on the upper surface of the information recording medium, and adhering to an illumination light that irradiates a light onto the upper surface of the information recording medium, as well as to inhibit glare from occurring on a read image of the upper surface of the information recording medium.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 6 is an exploded perspective view of the first illumination light and the second illumination light shown in FIG. 2.

DETAILED DESCRIPTION

Below, embodiments of the present invention will be described with reference to the drawings.

(Configuration Example of Information Reading Device)

Figure 1:
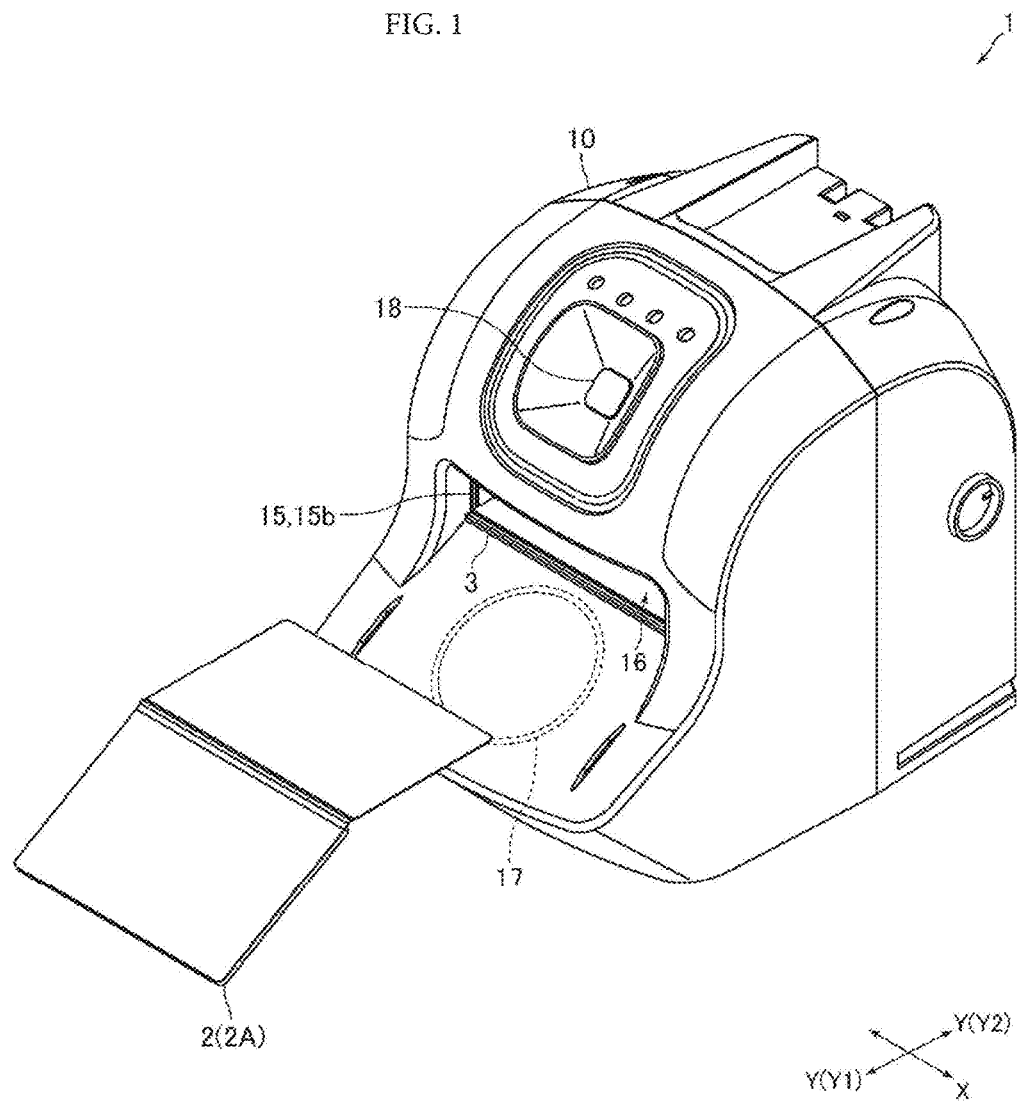
FIG. 1 is a perspective view of an information reading device according to an embodiment of the present invention.
Figure 2:
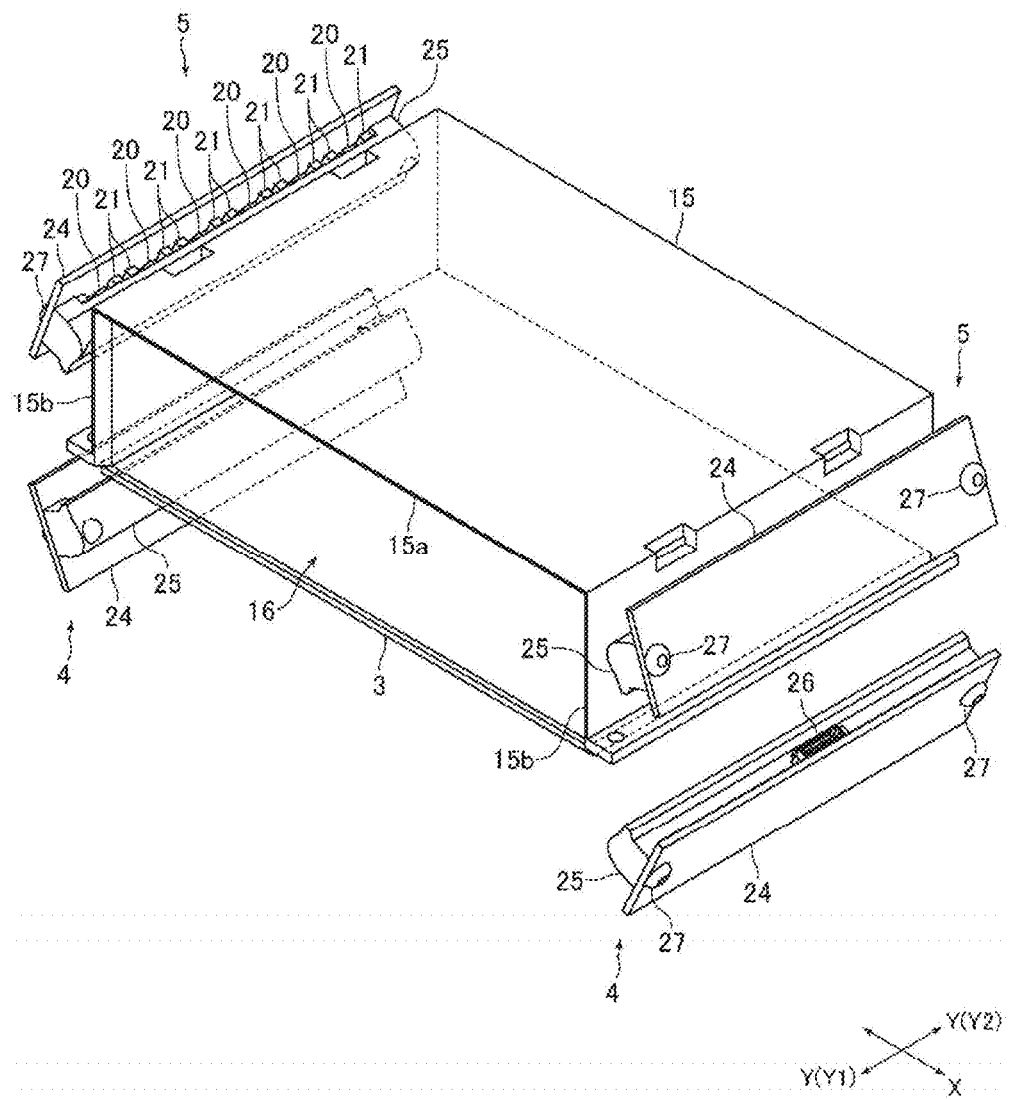
FIG. 2 is a perspective view showing a placement member, a cover member, a first illumination light, and a second illumination light of the information reading device shown in FIG. 1 removed.
Figure 3A:
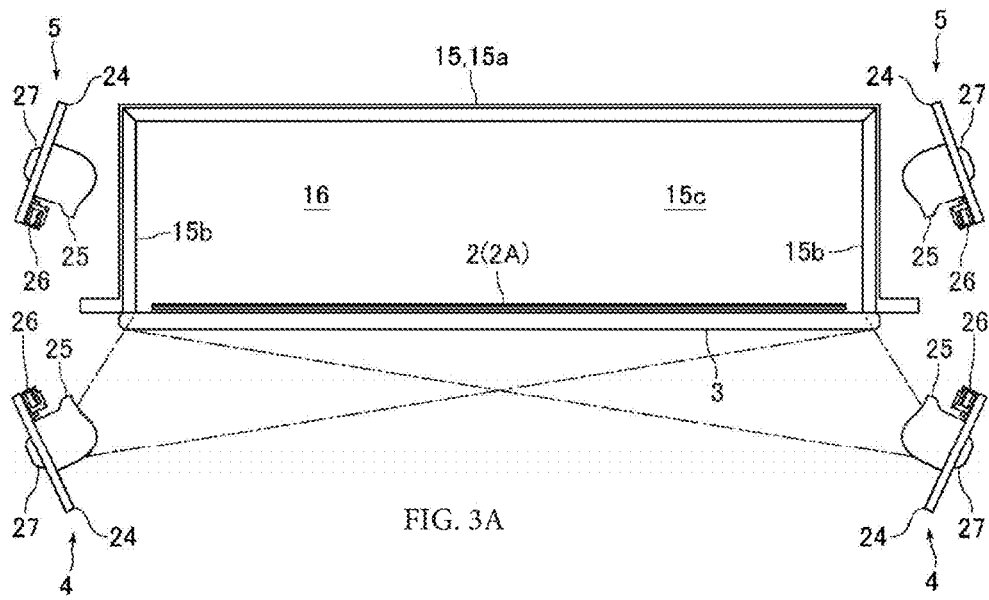
FIG. 3A and FIG. 3B are a front view of the placement member, the cover member, and the first illumination light, and the second illumination light shown in FIG. 2.
Figure 3B:
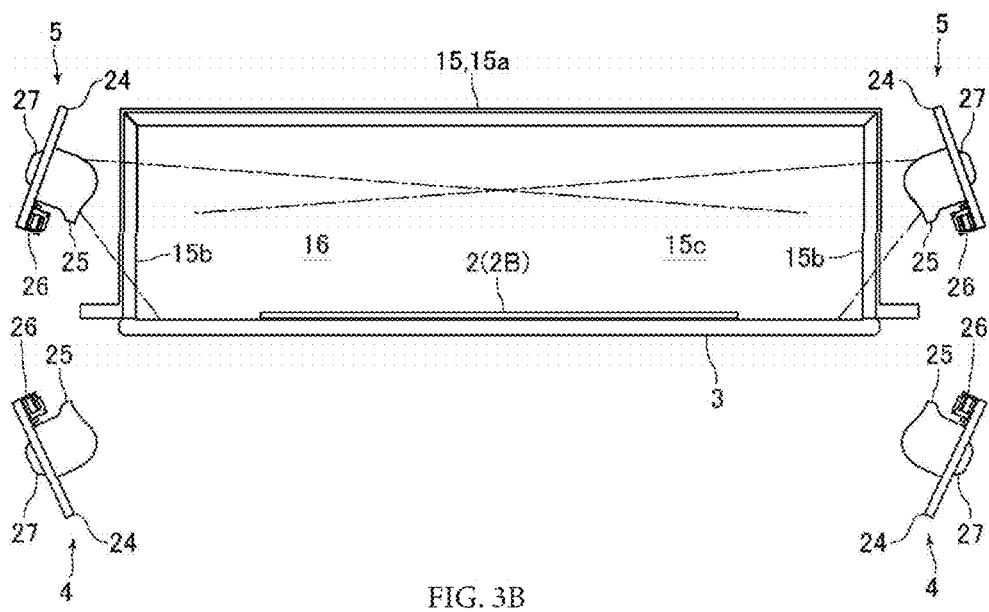
Figure 4:
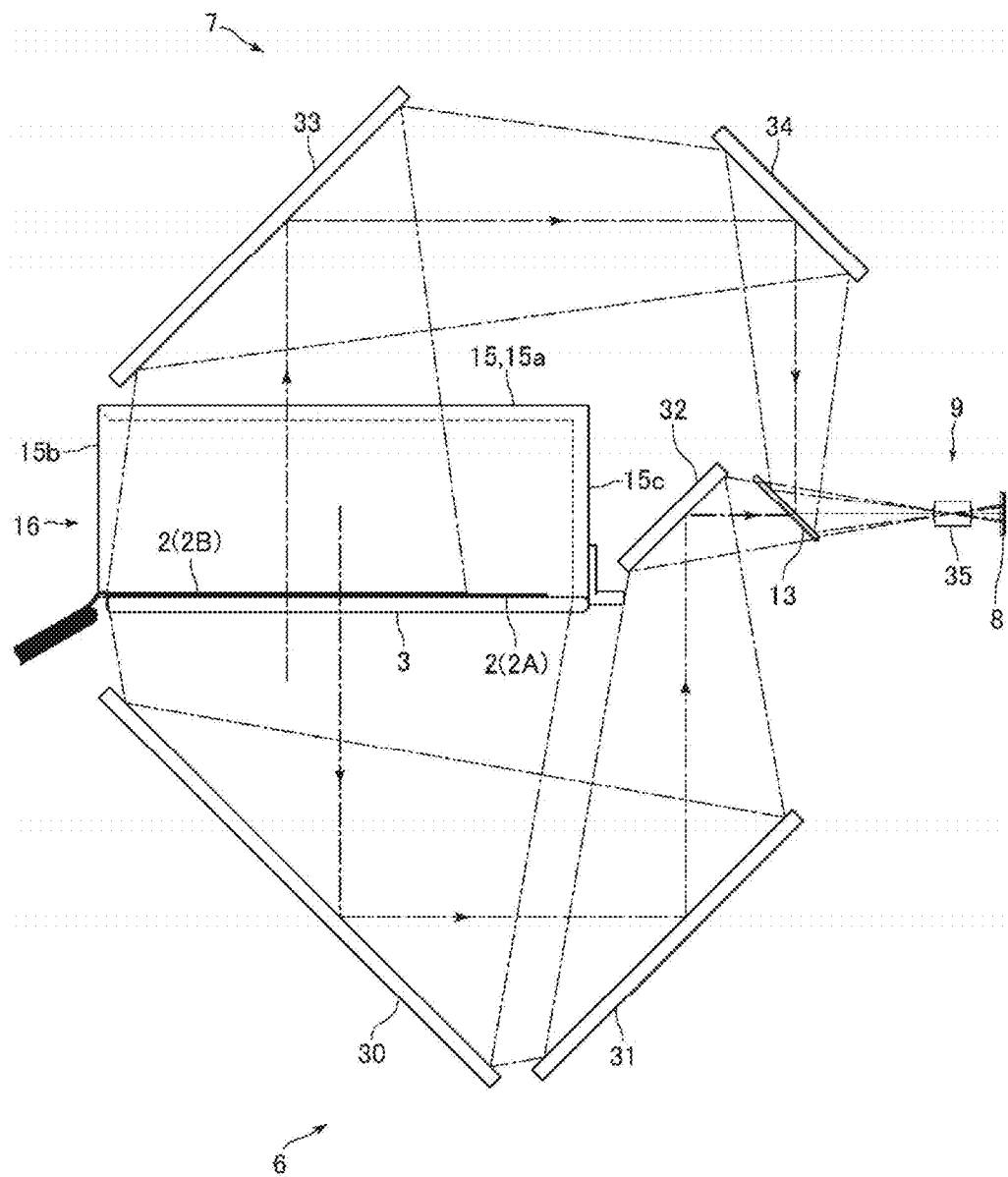
FIG. 4 is a side view for explaining a light path inside the information reading device shown in FIG. 1.
Figure 5A:
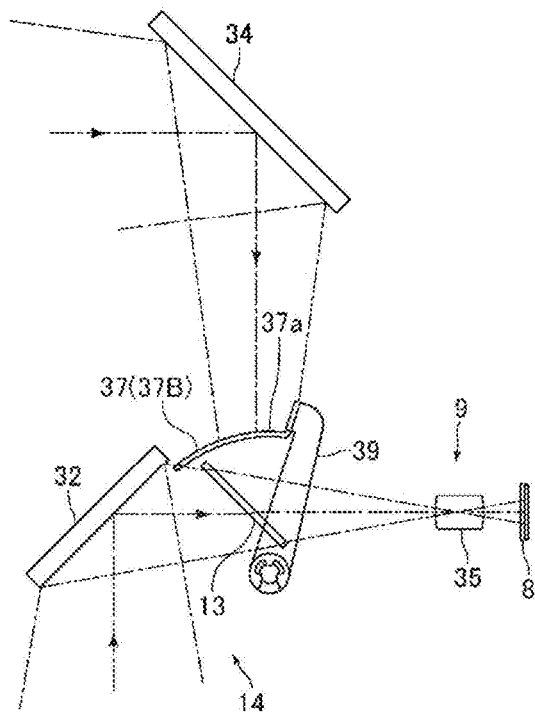
FIG. 5A and FIG. 5B are a side view for explaining the operation of a shutter mechanism of the information reading device shown in FIG. 1.
Figure 5B:
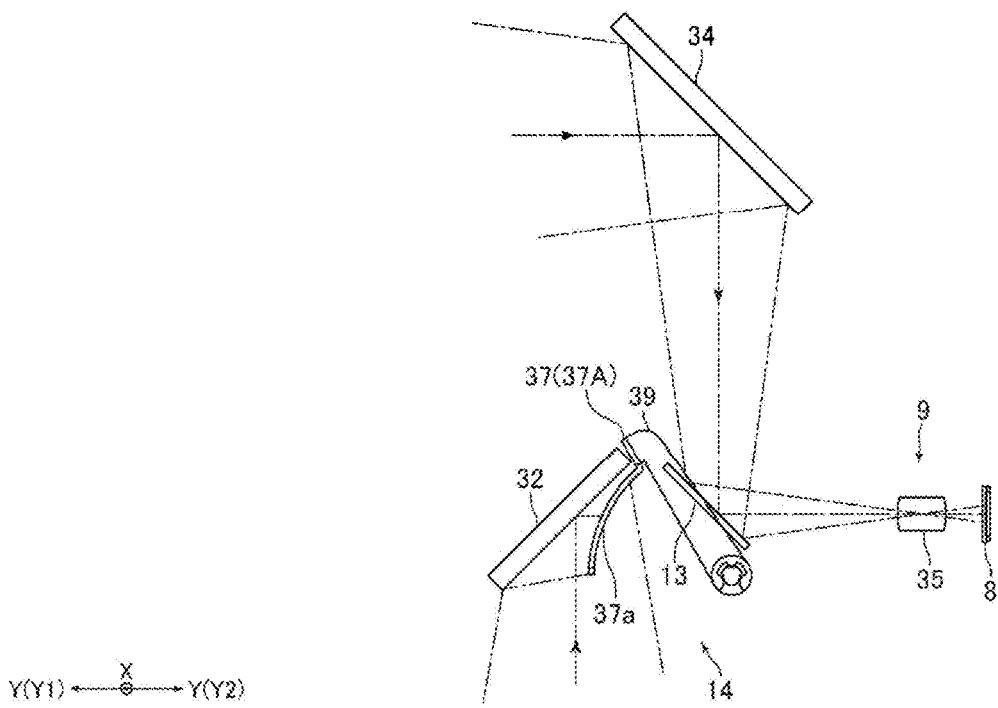

FIG. 1 is a perspective view of an information reading device 1 according to an embodiment of the present invention. FIG. 2 is a perspective view showing a glass plate 3, a cover member 15, and illumination lights 4 and 5 of the information reading device 1 shown in FIG. 1 removed. FIG. 3A and FIG. 3B are a front view of the glass plate 3, the cover member 15, and the illumination lights 4 and 5 shown in FIG. 2. FIG. 4 is a side view for explaining a light path inside the information reading device 1 shown in FIG. 1. FIG. 5A and FIG. 5B are a side view for explaining the operation of a shutter mechanism 14 of the information reading device 1 shown in FIG. 1.

The information reading device 1 of the present embodiment is a device that optically reads information recorded on an information recording medium 2. That is, the information reading device 1 is a device that reads characters and graphics and the like printed or the like on the information recording medium 2. This information reading device 1 is a manual reading device, in which the information recording medium 2 is manually inserted into the information reading device 1 and the information recording medium 2 is manually removed from the information reading device 1. Also, the information reading device 1 of the present embodiment is a relatively small desktop-type reading device. The information recording medium 2 read by the information reading device 1 is a passport 2A and an ID card 2B (refer to FIG. 3A and FIG. 3B). A photograph of the face of the owner is printed on the passport 2A and the ID card 2B.

In a case where the information recording medium 2 is the passport 2A, information recorded on the back surface of the front cover of the passport 2A is optically read by the information reading device 1. In a case where the information recording medium 2 is the ID card 2B, information recorded on both surfaces of the ID card 2B is optically read by the information reading device 1. The passport 2A of the present embodiment is an IC passport, and includes an IC page within which an IC chip and an antenna for communication are embedded. Also, the ID card 2B is a non-contact IC card, and an IC chip and an antenna for communication are embedded in the ID card 2B. The ID card 2B is formed in a rectangular shape.

The passport 2A is inserted in an open state into the information reading device 1. The thickness direction of the front page of the passport 2A that has been inserted in an open state into the information reading device 1 matches the up-down direction. Also, the thickness direction of the ID card 2B that has been inserted into the information reading device 1 matches the up-down direction. Note that in FIG. 4, the passport 2A and the ID card 2B are inserted together into the information reading device 1 to simplify the description, but in actuality, one of the passport 2A and the ID card 2B is inserted into the information reading device 1.

In the description below, the insertion direction side (Y2 direction side in FIG. 1 and the like) of the information recording medium 2 into the information reading device 1 will be the "far" side or the "rear" side, and the removal direction side (Y1 direction side in FIG. 1 and the like) of the information recording medium 2 from the information reading device 1 will be the "front" side. Also, the insertion-removal direction (Y direction in FIG. 1 and the like) of the information recording medium 2 with respect to the information reading device 1 will be the "front-rear direction", and the direction (X direction in FIG. 1 and the like) orthogonal to the up-down direction and the front-rear direction will be the "left-right direction".

The information reading device 1 is provided with a transparent glass plate 3 on which the information recording medium 2 is placed, an illumination light 4 that irradiates a light onto a lower surface of the information recording medium 2 placed on the glass plate 3, an illumination light 5 that irradiates a light onto an upper surface of the information recording medium 2 placed on the glass plate 3, an optical system 6 for reading information recorded on the lower surface of the information recording medium 2 placed on the glass plate 3, an optical system 7 for reading information recorded on the upper surface of the information recording medium 2 placed on the glass plate 3, an image pickup device 8, an image forming optical system 9 that provides an image of the light that has passed through the optical system 6 on the image pickup device 8 and provides an image of the light that has passed through the optical system 7 on the image pickup device 8, and a housing 10 within which these components are housed. The image pickup device 8 is a two-dimensional CMOS image sensor or a CCD image sensor. The glass plate 3 of the present embodiment is a placement member, the illumination light 4 is a first illumination light, and the illumination light 5 is a second illumination light. Also, the optical system 6 is a first optical system, and the optical system 7 is a second optical system.

Also, the information reading device 1 includes a beam splitter 13 that transmits some of the light that has passed through the optical system 6 toward the image forming optical system 9, and reflects some of the light that has passed through the optical system 7 toward the image forming optical system 9, and the shutter mechanism 14 that blocks the light incident to the beam splitter 13 from the optical system 7 when reading the information recorded on the lower surface of the information recording medium 2 placed on the glass plate 3, and blocks the light incident to the beam splitter 13 from the optical system 6 when reading the information recorded on the upper surface of the information recording medium 2 placed on the glass plate 3. The beam splitter 13 and the shutter mechanism 14 are housed in the housing 10.

Moreover, the information reading device 1 is provided with the cover member 15 that includes an upper surface portion 15a disposed above the information recording medium 2 placed on the glass plate 3, two side surface portions 15b that are connected to both left and right end sides of the upper surface portion 15a, and a far surface portion 15c that is connected to the far end side of the upper surface portion 15a. The cover member 15 of the present embodiment is formed by the upper surface portion 15a, the two side surface portions 15b, and the far surface portion 15c. The cover member 15 is made of transparent resin. For example, the cover member 15 is made of transparent acrylic resin. A light-blocking paint, for example, is applied to the far surface portion 15c, such that the far surface portion 15c serves as a light-blocking portion that blocks light going toward the far side. On the other hand, the upper surface portion 15a and the side surface portions 15b are transparent.

The upper surface portion 15a is formed in a rectangular flat plate shape, and is disposed such that the thickness direction of the upper surface portion 15a matches the up-down direction. Also, the upper surface portion 15a is disposed such that the end surface of the upper surface portion 15a is parallel to the front-rear direction or the left-right direction. The side surface portions 15b are formed in a rectangular flat plate shape, and are disposed such that the thickness direction of the side surface portions 15b matches the left-right direction. The far surface portion 15c is formed in a rectangular flat plate shape, and is disposed such that the thickness direction of the far surface portion 15c matches the front-rear direction. Both left and right ends of the far surface portion 15c are connected to the far ends of the side surface portions 15b.

The glass plate 3 is formed in a rectangular flat plate shape, and is disposed such that the thickness direction of the glass plate 3 matches the up-down direction. Also, the glass plate 3 is disposed such that the end surface of the glass plate 3 is parallel to the front-rear direction or the left-right direction. The lower ends of the side surface portions 15b and the lower end of the far surface portion 15c are in contact with the upper surface of the glass plate 3. In the present embodiment, the box-like medium disposition part 16 that is open on the front side and within which at least a portion of the information recording medium 2 is disposed, is formed by the glass plate 3 and the cover member 15. The medium disposition part 16 is formed in a rectangular parallelepiped box shape. As shown in FIG. 1, the portion other than the open front side of the medium disposition part 16 is covered by the housing 10.

The entire ID card 2B is placed on the glass plate 3. That is, the entire ID card 2B is placed in the medium disposition part 16. Also, a portion of the passport 2A is placed on the glass plate 3 such that the spine of the passport 2A in an open state is disposed on the front-end side of the glass plate 3. That is, a portion of the passport 2A is disposed in the medium disposition part 16. Also, the passport 2A is placed on the glass plate 3 such that the back surface of the front page on which personal information is recorded faces down. In the present embodiment, the width in the front-rear direction of the ID card 2B placed on the glass plate 3 is narrower than the width in the front-rear direction of the portion of the passport 2A that is placed on the glass plate 3. Also, the width in the left-right direction of the ID card 2B placed on the glass plate 3 is narrower than the width in the left-right direction of the passport 2A.

An antenna (not shown in the drawings) for communicating with the antenna for communication embedded in the ID card 2B is disposed under the glass plate 3. This antenna is disposed in a position where it will not get in the way when optically reading the information on the lower surface of the information recording medium 2 placed on the glass plate 3. Also, an antenna 17 for communicating with the antenna for communication that is embedded in the passport 2A is disposed in front side of the glass plate 3, as shown in FIG. 1. The antenna 17 is disposed on the side below the glass plate 3. Note that depending on the specifications of the passport 2A, communication may also be performed between the antenna disposed under the glass plate 3 and the antenna embedded in the passport 2A.

Also, the information reading device 1 includes a camera 18 that is disposed on the front surface side and an upper surface side of the information reading device 1, as shown in FIG. 1. The camera 18 is disposed above the medium disposition part 16. The optical axis of the camera 18 is inclined upward toward the front side. The camera 18 captures an image of the face of a person performing a reading operation of the information recording medium 2.

(Configuration and Disposition of Illumination Lights)

Figure 7A:
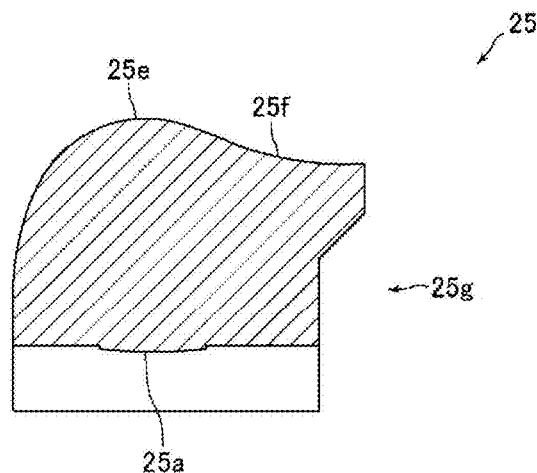
FIG. 7A, FIG. 7B, and FIG. 7C are a sectional view of an illumination light lens shown in FIG. 6.
Figure 7B:
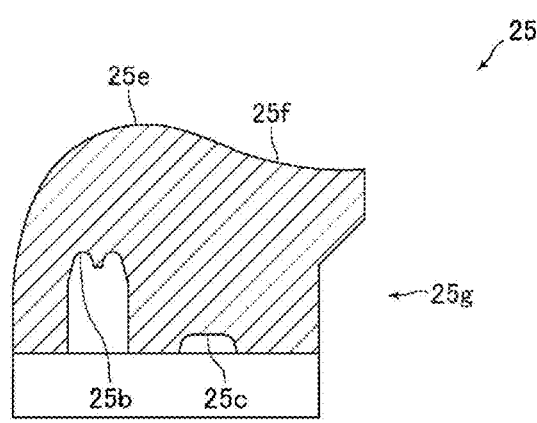
Figure 7C:
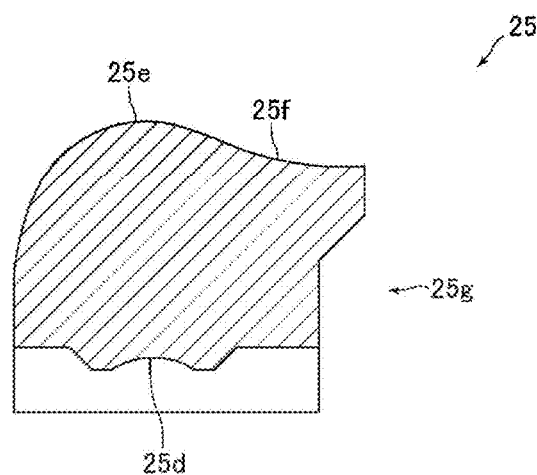

FIG. 6 is an exploded perspective view of the illumination lights 4 and 5 shown in FIG. 2. FIG. 7A to FIG. 7C is a sectional view of an illumination light lens 25 shown in FIG. 6.

The illumination lights 4 and 5 are provided with a plurality of light sources. The illumination lights 4 and 5 of the present embodiment include, as light sources, a plurality of white LEDs 20 that emit what light, a plurality of infrared LEDs 21 that emit infrared light, and a plurality of ultraviolet LEDs 22 that emit ultraviolet light. The white LEDs 20 are surface emission type LEDs, and emit diffused light. The infrared LEDs 21 emit parallel light. The ultraviolet LEDs 22 are spot emission type wide angle light emitting LEDs. Also, the illumination lights 4 and 5 include a substrate 24 on which the plurality of white LEDs 20, the plurality of infrared LEDs 21, and the plurality of ultraviolet LEDs 22 are mounted, and an illumination light lens 25 to which the white light emitted by the plurality of white LEDs 20, the infrared light emitted by the plurality of infrared LEDs 21, and ultraviolet light emitted by the plurality of ultraviolet LEDs 22 are incident.

The substrate 24 is formed in an elongated rectangular flat plate shape. The substrate 24 is disposed such that the longitudinal direction and the front-rear direction of the substrate 24 match. As shown in FIG. 6, two infrared LEDs 21, one ultraviolet LED 22, one white LED 20, and two infrared LEDs 21 are repeatedly mounted, in this order, along the longitudinal direction of the substrate 24, on one surface of the substrate 24. The two infrared LEDs 21 are disposed adjacent in the transverse direction of the substrate 24. Also, a connector 26 is mounted the one surface of the substrate 24 on which the white LEDs 20, the infrared LEDs 21, and the ultraviolet LEDs 22 are mounted.

The illumination light lens 25 is formed in an elongated, generally rectangular parallelepiped shape. The illumination light lens 25 is fixed to the one surface of the substrate 24 on which the white LEDs 20, the infrared LEDs 21, and the ultraviolet LEDs 22 are mounted. Also, the illumination light lens 25 is fixed to the substrate 24 by rivets 27. The white light emitted by the plurality of white LEDs 20, the infrared light emitted by the plurality of infrared LEDs 21, and ultraviolet light emitted by the plurality of ultraviolet LEDs 22, as described above, are incident to the illumination light lens 25. Light that passes through the illumination light lens 25 is irradiated onto the information recording medium 2.

As shown in FIG. 7, an incident surface 25a to which the white light emitted by the white LEDs 20 is incident, incident surfaces 25b and 25c to which the infrared light emitted by the infrared LEDs 21 is incident, and an incident surface 25d to which the ultraviolet light emitted by the ultraviolet LEDs 22 is incident are formed on the illumination light lens 25. The incident surface 25a is formed in a convex shape such that uniform white light is irradiated onto the information recording medium 2 (refer to FIG. 7A). The incident surface 25d is formed in a concave shape such that uniform ultraviolet light is irradiated onto the information recording medium 2 (refer to FIG. 7C).

The incident surfaces 25b and 25c are formed in concave shapes such that uniform infrared light is irradiated onto the information recording medium 2 (refer to FIG. 7B). The infrared light emitted from one of the two infrared LEDs 21 disposed adjacent in the transverse direction of the substrate 24 is incident to the incident surface 25b, and the infrared light emitted from the other infrared LED 21 is incident to the incident surface 25c. The depth of the concave portion where the incident surface 25b is formed is deeper than the depth of the concave portion where the incident surface 25c is formed.

A light emission surface of the illumination light lens 25 is formed by a convex surface 25e and a concave surface 25f, as shown in FIG. 7A to FIG. 7C. Also, a cutout portion 25g for preventing interference between the illumination light lens 25 and electronic components such as the connector 26 mounted on the substrate 24, is formed on a side surface of the illumination light lens 25. The cutout portion 25g is formed in the side surface along the longitudinal direction of the illumination light lens 25. Also, the cutout portion 25g is formed throughout the entire region in the longitudinal direction of the illumination light lens 25. The concave surface 25f is formed on the cutout portion 25g side, and the convex surface 25e is formed on the side where the cutout portion 25g is not formed.

As shown in FIG. 3A and FIG. 3B, the illumination light 4 is disposed on the side below the glass plate 3. Also, the information reading device 1 includes two of the illumination lights 4, and these illumination lights 4 are disposed one each on both outer sides of the glass plate 3 in the left-right direction. Also, the illumination lights 4 are disposed in positions out of the viewing angle of the image pickup device 8. The illumination light 4 disposed to the right side of the glass plate 3 is disposed such that the substrate 24 of this illumination light 4 is inclined upward to the right, and the illumination light 4 disposed to the left side of the glass plate 3 is disposed such that the substrate 24 of this illumination light 4 is inclined upward to the left. The two illumination lights 4 are disposed such that the illumination light lenses 25 face inward in the left-right direction.

Also, the illumination lights 4 are disposed such that the cutout portion 25g of the illumination light lens 25 faces upward, and the convex surface 25e is disposed lower than the concave surface 25f. That is, the convex surface 25e is disposed in a position farther away from the information recording medium 2 than the concave surface 25f. The illumination lights 4 irradiate light toward the information recording medium 2 placed on the glass plate 3 from the outer sides in the left-right direction, and from the obliquely lower sides. Also, the light emitted from the illumination lights 4 and transmitted through the glass plate 3 is irradiated onto the lower surface of the information recording medium 2 placed on the glass plate 3. Also, the light emitted from the convex surface 25e is irradiated to a location on the information recording medium 2 that is far from the illumination light 4 in the left-right direction, and the light emitted from the concave surface 25f is irradiated to a location on the information recording medium 2 that is close to the illumination light 4 in the left-right direction.

The illumination light 5 is disposed on the side above the information recording medium 2 placed on the glass plate 3. Also, the information reading device 1 includes two of the illumination lights 5, and these illumination lights 5 are disposed one each on both outer sides of the medium disposition part 16 in the left-right direction. That is, one illumination light 5 of the two illumination lights 5 is disposed to the right side of the side surface portion 15b disposed on the right side, and the other illumination light 5 of the two illumination lights 5 is disposed to the left side of the side surface portion 15b disposed on the left side. Also, the illumination lights 5 are disposed in positions out of the viewing angle of the image pickup device 8. The illumination light 5 disposed to the right side of the side surface portion 15b disposed on the right side is disposed such that the substrate 24 of this illumination light 5 is inclined downward to the right, and the illumination light 5 disposed to the left side of the side surface portion 15b disposed on the left side is disposed such that the substrate 24 of this illumination light 5 is inclined downward to the left. The two illumination lights 5 are disposed such that the illumination light lenses 25 face inward in the left-right direction.

Also, the illumination lights 5 are disposed such that the cutout portion 25g of the illumination light lens 25 faces downward, and the convex surface 25e is disposed lower than the concave surface 25f. That is, the convex surface 25e is disposed in a position farther away from the information recording medium 2 than the concave surface 25f. The illumination lights 5 irradiate light toward the information recording medium 2 placed on the glass plate 3 from the outer sides in the left-right direction, and from the obliquely upper sides. Also, the light emitted from the illumination lights 5 and transmitted through the side surface portions 15b is irradiated onto the upper surface of the information recording medium 2 placed on the glass plate 3. Also, the light emitted from the convex surface 25e is irradiated to a location on the information recording medium 2 that is far from the illumination light 5 in the left-right direction, and the light emitted from the concave surface 25f is irradiated to a location on the information recording medium 2 that is close to the illumination light 5 in the left-right direction.

Note that the infrared light irradiated from the illumination lights 4 and 5 is used to read machine-readable printed information such as OCR characters. Also, the ultraviolet light irradiated from the illumination lights 4 and 5 is used to read printed information necessary to determine the authenticity of the information recording medium 2. More specifically, the ultraviolet light irradiated from the illumination lights 4 and 5 is used to read information printed with invisible fluorescent ink.

(Configuration and Disposition of Optical Systems, Image Forming Optical System, Beam Splitter, and Image Pickup Device)

The optical system 6 includes three reflection mirrors (total reflection mirrors) 30, 31, and 32 formed in rectangular flat plate shapes. The reflection mirror 30 is larger than the reflection mirror 31, and the reflection mirror 31 is larger than the reflection mirror 32. The reflection mirrors 30 and 31 are disposed on the side below the glass plate 3. More specifically, the reflection mirror 30 is disposed on the side below the passport 2A placed on the glass plate 3. Also, the reflection mirror 31 is disposed at approximately the same height as the reflection mirror 30, and is disposed farther to the rear than the reflection mirror 30. The reflection mirror 32 is disposed to the rear of the medium disposition part 16. That is, the reflection mirror 32 is disposed to the rear of the far surface portion 15c of the cover member 15. Also, the reflection mirror 32 is disposed above the reflection mirror 31.

The reflection mirrors 30 to 32 are disposed inclined at a predetermined angle with respect to the up-down direction. More specifically, as shown in FIG. 4, the reflection mirrors 30 to 32 are disposed inclined at a predetermined angle with respect to the up-down direction when viewed from the left-right direction. The reflection mirror 30 is inclined downward toward the rear, and the reflection mirrors 31 and 32 are inclined upward toward the rear. The inclination angle of the reflection mirrors 30 to 32 with respect to the up-down direction is approximately 45°.

Also, the light reflected by the lower surface of the information recording medium 2 placed on the glass plate 3 is incident to the reflection mirror 30. The light reflected by the reflection mirror 30 is incident to the reflection mirror 31, and the light reflected by the reflection mirror 31 is incident to the reflection mirror 32. With the reflection mirror 32, the optical axis of the light reflected by the lower surface of the information recording medium 2 and directed toward the lower side is bent toward the rear. Also, with the reflection mirror 31, the optical axis of the light reflected by the reflection mirror 30 and directed toward the rear is bent upward, and with the reflection mirror 32, the optical axis of the light reflected by the reflection mirror 31 and directed upward is bent toward the rear.

The optical system 7 includes two reflection mirrors (total reflection mirrors) 33 and 34 formed in rectangular flat plate shapes. The reflection mirror 33 is larger than the reflection mirror 34. The reflection mirrors 33 and 34 are disposed on the side above the information recording medium 2 placed on the glass plate 3. More specifically, the reflection mirror 33 is disposed on the side above the ID card 2B placed on the glass plate 3. Also, the reflection mirror 33 is disposed on the side above the upper surface portion 15a of the cover member 15 (that is, on the side above the medium disposition part 16). The reflection mirror 34 is disposed at approximately the same height as the reflection mirror 33, and is disposed farther to the rear than the glass plate 3 (that is, farther to the rear than the medium disposition part 16).

The reflection mirrors 33 to 34 are disposed inclined at a predetermined angle with respect to the up-down direction. More specifically, as shown in FIG. 4, the reflection mirrors 33 to 34 are disposed inclined at a predetermined angle with respect to the up-down direction when viewed from the left-right direction. The reflection mirror 33 is inclined upward toward the rear, and the reflection mirror 34 is inclined downward toward the rear. The inclination angle of the reflection mirrors 33 to 34 with respect to the up-down direction is approximately 45°.

The light reflected by the upper surface of the information recording medium 2 placed on the glass plate 3 is incident to the reflection mirror 33. The light reflected by the reflection mirror 33 is incident to the reflection mirror 34. With the reflection mirror 33, the optical axis of the light reflected by the upper surface of the information recording medium 2 and directed upward is bent toward the rear, and with the reflection mirror 34, the optical axis of the light reflected by the reflection mirror 33 and directed toward the rear is bent downward.

The image forming optical system 9 includes an image forming lens 35. The image forming lens 35 is disposed to the rear of the reflection mirror 32. That is, image forming lens 35 is disposed to the rear of the far surface portion 15c of the cover member 15. Also, image forming lens 35 is disposed farther to the rear than the reflection mirror 34. The image pickup device 8 is disposed to the rear of the image forming lens 35. That is, the image pickup device 8 is disposed to the rear of (on the far side of) the far surface portion 15c. The image pickup device 8 is disposed such that an imaging surface of the image pickup device 8 faces forward.

The beam splitter 13 is formed in a rectangular flat plate shape. The beam splitter 13 of the present embodiment is a half mirror in which the transmittance and reflectance of light are equal. The beam splitter 13 is disposed between the reflection mirror 32 and the image forming lens 35 in the front-rear direction. That is, the beam splitter 13 is disposed to the rear of the reflection mirror 32 and in front of the image forming lens 35. Also, the beam splitter 13 is disposed below the reflection mirror 34.

The beam splitter 13 is disposed inclined at a predetermined angle with respect to the up-down direction. More specifically, as shown in FIG. 4, the beam splitter 13 is disposed inclined at a predetermined angle with respect to the up-down direction when viewed from the left-right direction. The beam splitter 13 is inclined downward toward the rear. The inclination angle of the beam splitter 13 with respect to the up-down direction is approximately 45°. The beam splitter 13 transmits half of the light reflected by the reflection mirror 32 toward the image forming lens 35, and reflects half of the light reflected by the reflection mirror 34 toward the image forming lens 35.

(Configuration of Shutter Mechanism)

The shutter mechanism 14 is provided with a shutter 37 capable of moving between a first light blocking position 37A (refer to FIG. 5B) that blocks a light path between the optical system 6 and the beam splitter 13 (that is, a light path between the reflection mirror 32 and the beam splitter 13), and a second light blocking position 37B (refer to FIG. 5A) that blocks a light path between the optical system 7 and the beam splitter 13 (that is, a light path between the reflection mirror 34 and the beam splitter 13). The shutter 37 is provided with a light blocking portion 37a that blocks a light path between the reflection mirrors 32 and 34 and the beam splitter 13.

Also, the shutter mechanism 14 is provided with a shutter drive mechanism that moves the shutter 37 between the first light blocking position 37A and the second light blocking position 37B. The shutter drive mechanism is provided with a lever member 39 to which the shutter 37 is fixed, and a solenoid (not shown in the drawings) that rotates the lever member 39, and the like. The lever member 39 is able to rotate with the left-right direction as the axial direction of rotation.

(Information Reading Operation of Information Reading Device)

Also, when the information recorded on the passport 2A is to be read by the information reading device 1, the passport 2A is placed on the glass plate 3 such that the back surface of the front page on which personal information is recorded faces downward. When the passport 2A is placed on the glass plate 3, the illumination light 4 irradiates light and the information recorded on the passport 2A is optically read. At this time, the shutter 37 is disposed at the second light blocking position 37B. Also, the illumination light 5 does not irradiate light.

On the other hand, when information recorded on the ID card 2B is to be read by the information reading device 1, when the ID card 2B is placed on the glass plate 3, first, the illumination light 4 irradiates light and the information recorded on the lower surface of the ID card 2B is optically read. At this time, the shutter 37 is disposed at the second light blocking position 37B, and the illumination light 5 does not irradiate light. When information recorded on the lower surface of the ID card 2B is to be read, the shutter 37 moves to the first light blocking position 37A, and the illumination light 5 irradiates light and the information recorded on the upper surface of the ID card 2B is optically read. At this time, the illumination light 4 does not irradiate light.

Note that when information recorded on the ID card 2B is to be read, the information recorded on the lower surface of the ID card 2B may be read after the information recorded on the upper surface of the ID card 2B is read. Also, when information recorded on the ID card 2B is to be read, the information recorded on the lower surface of the ID card 2B and the information recorded on the upper surface of the ID card 2B may be read in several tens of milliseconds, for example.

(Main Effects of the Present Embodiment)

As described above, in the present embodiment, the box-like medium disposition part 16 that is open on the front side and within which at least a portion of the information recording medium 2 is disposed, is formed by the glass plate 3 and the cover member 15. Also, in the present embodiment, the illumination lights 4 and 5 and the optical systems 6 and 7 are disposed outside the medium disposition part 16. Therefore, with the present embodiment, it is possible to prevent dust from getting into the places where the illumination lights 4 and 5 are disposed and the places where the optical systems 6 and 7 are disposed, from the place where the information recording medium 2 is disposed, in the medium disposition part 16. Thus, with the present embodiment, it is possible to inhibit dust from adhering to the reflection mirrors 30 to 34 that constitute the optical systems 6 and 7, as well as to the illumination lights 4 and 5.

Also, in the present embodiment, the portion other than the open front side of the medium disposition part 16 is covered by the housing 10, and the illumination lights 4 and 5 and the optical systems 6 and 7 are housed in the housing 10. Therefore, with the present embodiment, it is also possible to prevent dust from getting into the places where the illumination lights 4 and 5 are disposed and the places where the optical systems 6 and 7 are disposed, from places other than the place where the information recording medium 2 is disposed, in the medium disposition part 16. Thus, with the present embodiment, it is possible to effectively inhibit dust from adhering to the reflection mirrors 30 to 34 that constitute the optical systems 6 and 7, as well as to the illumination lights 4 and 5.

In the present embodiment, the reflection mirror 33 to which the light reflected by the upper surface of the information recording medium 2 is incident is disposed above the information recording medium 2 that is placed on the glass plate 3 (more specifically, above the ID card 2B). Meanwhile, the illumination light 5 is disposed one each on both outer sides of the medium disposition part 16 in the left-right direction, and the light that is emitted from the illumination light 5 and transmitted through the transparent side surface portions 15b is irradiated onto the upper surface of the information recording medium 2 placed on the glass plate 3. Therefore, in the present embodiment, the incident angle of the light that the illumination light 5 irradiates onto the upper surface of the information recording medium 2 is increased, which makes it possible to prevent the light reflected by the upper surface of the information recording medium 2 from being directly incident to the image pickup device 8. Thus, with the present embodiment, glare can be inhibited from occurring on a read image on the upper surface of the information recording medium 2.

Also, in the present embodiment, the illumination light 5 is disposed one each on both outer sides of the medium disposition part 16 in the left-right direction, and the light that is emitted from the illumination light 5 and transmitted through the transparent side surface portions 15b is irradiated onto the upper surface of the information recording medium 2 placed on the glass plate 3, so an operator that inserts and removes the information recording medium 2 with respect to the medium disposition part 16 on the front side of the information reading device 1 will no longer feel that the light irradiated onto the upper surface of the information recording medium 2 from the illumination light 5 is bright. Also, in the present embodiment, the far surface portion 15c of the cover member 15 is a light blocking portion that blocks light going toward the far side, so the light irradiated from the illumination lights 4 and 5 can be prevented from being directly incident to the image pickup device 8 disposed on the far side of the far surface portion 15c.

In the present embodiment, the white light emitted from the plurality of white LEDs 20, the infrared light emitted by the plurality of infrared LEDs 21, and ultraviolet light emitted by the plurality of ultraviolet LEDs 22 mounted on the substrate 24 are incident to the common illumination light lens 25. Therefore, with the present embodiment, the structure of the information reading device 1 can be simplified compared to a case where an illumination light lens to which white light is incident, an illumination light lens to which infrared light is incident, and an illumination light lens to which ultraviolet light is incident are provided separately.

(Other Embodiments)

The embodiment described above is one example of a preferred embodiment of the present invention, but the invention is not limited to this; various embodiments are possible without departing from the scope of the present invention.

In the embodiment described above, if uniform white light is irradiated onto the information recording medium 2, the incident surface 25a of the illumination light lens 25 may be formed in a planar shape or may be formed in a concave shape. Similarly, if uniform infrared light is irradiated onto the information recording medium 2, the incident surfaces 25b and 25c of the illumination light lens 25 may be formed in a planar shape or may be formed in a convex shape. Also, if uniform ultraviolet light is irradiated onto the information recording medium 2, the incident surface 25d of the illumination light lens 25 may be formed in a planar shape or may be formed in a convex shape. Also, if uniform white light, infrared light, and ultraviolet light are irradiated onto the information recording medium 2, the light emission surface of the illumination light lens 25 may be formed by a convex surface.

In the embodiment described above, a reflection mirror that rotates between a position that causes the light that has passed through the optical system 6 to pass toward the image forming optical system 9, and a position that causes the light that has passed through the optical system 7 to reflect toward the image forming optical system 9 may be provided instead of the beam splitter 13. This reflection mirror rotates 45° with the left-right direction as the axial direction of rotation, similar to the reflection mirror of a single-lens reflex camera, for example. In this case, the shutter mechanism 14 becomes unnecessary.

In the embodiment described above, the optical systems 6 and 7 may be configured such that the beam splitter 13 causes some of the light that has passed through the optical system 6 to reflect toward the image forming optical system 9, and causes some of the light that has passed through the optical system 7 to be transmitted toward the image forming optical system 9. In this case, for example, the optical system 6 is provided with two reflection mirrors, and the optical system 7 is provided with three reflection mirrors. Also, the number of reflection mirrors provided in the optical systems 6 and 7 may be four or more.

In the embodiment described above, the illumination lights 4 and 5 may be provided with a light guiding member instead of the illumination light lens 25. Also, in the embodiment described above, the image forming optical system and the image pickup device to which the light that has passed through the optical system 6 is incident, and the image forming optical system and the image pickup device to which the light that has passed through the optical system 7 is incident may be provided separately. Moreover, in the embodiment described above, the information reading device 1 may be provided with a transparent resin plate such as an acrylic plate, for example, instead of the glass plate 3.

In the embodiment described above, an IC chip does not have to be embedded in the information recording medium 2. In this case, the antenna disposed below the glass plate 3 and the antenna 17 are unnecessary. Also, in the embodiment described above, the information recording medium 2 may be a medium other than the passport 2A and the ID card 2B. For example, the information recording medium 2 may be a driver's license. Also, in the embodiment described above, the information reading device 1 is a manual reading device, but the information reading device to which the structure of at least an embodiment of the present invention is applied may be a medium conveying type reading device having an information recording medium conveying mechanism.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. An information reading device that optically reads information recorded on an information recording medium, the information reading device comprising:
   a transparent placement member on which the information recording medium is placed;
   a first illumination light structured to irradiate a light onto a lower surface of the information recording medium placed on the placement member;
   a second illumination light structured to irradiate a light onto an upper surface of the information recording medium placed on the placement member;
   a first optical system structured to read information recorded on the lower surface of the information recording medium placed on the placement member;
   a second optical system structured to read information recorded on the upper surface of the information recording medium placed on the placement member; and
   a cover member having an upper surface portion disposed above the information recording medium placed on the placement member, side surface portions that are connected to both left and right end sides of the upper surface portion, and a far surface portion that is connected to a far end side of the upper surface portion,
   when an insertion direction side of the information recording medium into the information reading device is a far side, a removal direction side of the information recording medium from the information reading device is a front side, an insertion-removal direction of the information recording medium with respect to the information reading device is a front-rear direction, and a direction orthogonal to an up-down direction and the front-rear direction is a left-right direction,
   wherein the second optical system comprises a reflection mirror that is disposed above the upper surface portion and to which light reflected by the upper surface of the information recording medium is incident,
   lower ends of the side surface portions and a lower end of the far surface portion are in contact with the upper surface of the placement member,
   a box shaped medium disposition part that is open on the front side, and within which at least a portion of the information recording medium is disposed, is formed by the placement member and the cover member,
   the upper surface portion and the side surface portions are transparent,
   the second illumination light is disposed on both outer sides of the medium disposition part in the left-right direction, and
   light emitted from the second illumination light and transmitted through the side surface portions is irradiated onto the upper surface of the information recording medium placed on the placement member.

2. The information reading device according to claim 1, comprising
   an image pickup device disposed on the far side of the far surface portion,
   wherein the far surface portion is a light blocking portion that blocks light going toward the far side.

3. The information reading device according to claim 2, wherein:
   the first illumination light and the second illumination light comprise a plurality of white LEDs that emit white light, a plurality of infrared LEDs that emit infrared light, a plurality of ultraviolet LEDs that emit ultraviolet light, a substrate on which the plurality of white LEDs, the plurality of infrared LEDs, and the plurality of ultraviolet LEDs are mounted, and an illumination light lens to which the white light emitted by the plurality of white LEDs, the infrared light emitted by the plurality of infrared LEDs, and the ultraviolet light emitted by the plurality of ultraviolet LEDs are incident.

4. The information reading device according to claim 3, wherein:
   an incident surface for the white light, of the illumination light lens, is formed in a convex shape,
   an incident surface for the infrared light, of the illumination light lens, is formed in a concave shape, and
   an incident surface for the ultraviolet light, of the illumination light lens, is formed in a concave shape.

5. The information reading device according to claim 1, wherein:
   the first illumination light and the second illumination light comprise a plurality of white LEDs that emit white light, a plurality of infrared LEDs that emit infrared light, a plurality of ultraviolet LEDs that emit ultraviolet light, a substrate on which the plurality of white LEDs, the plurality of infrared LEDs, and the plurality of ultraviolet LEDs are mounted, and an illumination light lens to which the white light emitted by the plurality of white LEDs, the infrared light emitted by the plurality of infrared LEDs, and the ultraviolet light emitted by the plurality of ultraviolet LEDs are incident.

6. The information reading device according to claim 5, wherein:
   an incident surface for the white light, of the illumination light lens, is formed in a convex shape;
   an incident surface for the infrared light, of the illumination light lens, is formed in a concave shape; and
   an incident surface for the ultraviolet light, of the illumination light lens, is formed in a concave shape.

* * * * *